United States Patent
Emberty et al.

(10) Patent No.: US 6,600,703 B1
(45) Date of Patent: Jul. 29, 2003

(54) MAGAZINE FOR A PLURALITY OF REMOVABLE HARD DISK DRIVES

(75) Inventors: Robert G. Emberty, Tucson, AZ (US); Craig Klein, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 09/844,130

(22) Filed: Apr. 26, 2001

(51) Int. Cl.⁷ .............................................. G11B 17/22
(52) U.S. Cl. ...................................................... 369/30.83
(58) Field of Search ........................ 369/178.01, 36.01, 369/30.54, 30.69, 30.78, 30.83; 361/685; 439/248

(56) References Cited

U.S. PATENT DOCUMENTS

| | | |
|---|---|---|
| 4,170,031 A | 10/1979 | Beuch et al. |
| 4,761,785 A | 8/1988 | Clark et al. |
| 4,864,511 A | 9/1989 | Moy et al. |
| 5,123,000 A | 6/1992 | Fitzgerald et al. |
| 5,197,055 A | 3/1993 | Hartung et al. |
| 5,255,251 A * | 10/1993 | Fitzgerald et al. ........ 369/30.45 |
| 5,289,589 A | 2/1994 | Bingham et al. |
| 5,377,121 A | 12/1994 | Dimitri et al. |
| 5,423,046 A | 6/1995 | Nunnelley et al. |
| 5,638,347 A | 6/1997 | Baca et al. |
| 5,875,063 A | 2/1999 | Corrington et al. |
| 5,915,081 A | 6/1999 | Yamamoto et al. |
| 5,970,030 A | 10/1999 | Dimitri et al. |
| 5,983,357 A | 11/1999 | Sun |
| 6,005,745 A | 12/1999 | Filkins et al. |
| 6,022,180 A | 2/2000 | Motoyama et al. |
| 2002/0144044 A1 * | 10/2002 | Moon et al. ................. 710/302 |

* cited by examiner

*Primary Examiner*—George J. Letscher
(74) *Attorney, Agent, or Firm*—Garth Janke; Durando Birdwell & Janke, P.L.C.

(57) ABSTRACT

A magazine for a plurality of removable disk drives. The magazine provides physical and electrical support for the disk drives, and includes a magazine backplane for electrically connecting to the disk drives, and a module connector for electrically connecting to a host computer, preferably at a backplane of the library. Preferably, the magazine also supports a connecting circuit for implementing a fibre channel arbitration loop and intelligent hub for reconfiguring the fibre channel arbitration loop if one or more of the disk drives fails.

22 Claims, 2 Drawing Sheets

MAGAZINE FOR A PLURALITY OF REMOVABLE HARD DISK DRIVES

TECHNICAL FIELD

The present invention relates to a magazine for use in a library of hard disk drives.

BACKGROUND OF THE INVENTION

Large scale computing devices often employ a library of removable computer memory media to provide for increased storage capability and the sharing of media by multiple hosts. In such a library, the media are shelved in storage bins for retrieval by a robotic picking apparatus or "picker." Such a picker for optical disk media is described in Dimitri et al., U.S. Pat. No. 5,377,121, which is herein incorporated by reference in its entirety. Tape cassettes are another common library media. The library has at least one drive receptacle coupled to one or more host computers that may read or write to the media.

When a host requests a particular medium in the library, the picker is typically commanded to travel to the storage bin in the library where the medium is shelved, grip the medium, remove the medium from the storage bin, travel to a destination drive having input/output ("I/O") connections with the host, insert the medium into the drive, and power the drive.

A problem with these prior art libraries is that optical media provides relatively slow reading and writing, while tape media provides relatively slow random access.

In recognition of these problems, the concept of a library of hard disk drives was developed, which is the subject of the assignee's companion application entitled LIBRARY OF HARD DISK DRIVES WITH TRANSPARENT EMULATING INTERFACE, executed on Apr. 9, 2001 by inventors Kamal Dimitri, Robert G. Emberty, Craig Klein, and Daniel J. Winarski, filed on Apr. 26, 2001, and incorporated herein by reference in its entirety. According to the concept, hard disk drives are stored in associated storage locations in the library. The robotic picker is adapted to couple and decouple a selected disk drive from a destination receptacle that is coupled to the one or more host computers requesting data.

The hard disk drive library provides the advantage of relative speed as compared to libraries employing optical or tape media. Entire hard disk drives, rather than hard disk media, are exchanged in the library to remain within the close mechanical tolerances required for efficient use of this memory element.

In a basic form of the concept, the destination receptacle provides power connections to the disk drive and I/O connections to the host computers, and the robotic picker retrieves the selected disk drive from its storage location, carries the disk drive to and inserts the disk drive into the destination receptacle. The disk drive is then powered and spins up to its operating speed. Finally, when this operating speed is reached, the data on the disk drive may be accessed by the computer.

As may be readily appreciated, all of this movement takes time, and efforts are constantly being made to decrease the time required to access memory elements in the library.

Disk drives are often virtually combined in a method known in the art as RAID ("redundant array of independent disks"), to gain speed, redundancy, or both. However, the disks in the array are physically separate and distinct from one another and are stored separately in the library, and installed into or removed from the destination backplane separately by the picker as aforedescribed. Therefore, although the computer may treat the RAID array as a single disk, the time required to set up the array for use by the computer is multiplied by the number of disks in the array. Moreover, as the connections to the destination backplane must be made separately for each of the disks in the array, the reliability of connecting the array is reduced from that of a single disk.

Accordingly, there is a need for a magazine for a plurality of removable disk drives that provides for decreasing the time and increasing the reliability of loading and unloading an array of disks in a disk drive library.

SUMMARY OF THE INVENTION

The magazine for a plurality of removable disk drives of the present invention solves the aforementioned problems and meets the aforementioned needs by providing physical and electrical support for the plurality of disk drives. The magazine includes a magazine backplane for electrically connecting to the disk drives, and a module connector for electrically connecting to a host computer, preferably at a backplane of the library. Preferably, the magazine also supports a connecting circuit for implementing a fibre channel arbitration loop and intelligent hub for reconfiguring the fibre channel arbitration loop if one or more of the disk drives fails.

Therefore, it is a principal object of the present invention to provide a magazine for a plurality of removable disk drives.

It is another object of the present invention to provide a magazine for a plurality of removable disk drives that provides for interconnecting the plurality of disk drives with a computer with a single connection.

It is yet another object of the present invention to provide a magazine for a plurality of removable disk drives that provides for interconnecting the plurality of disk drives as a RAID and a computer with a single connection.

It is still another object of the present invention to provide a magazine for a plurality of removable disk drives that provides a selection mechanism supported by the magazine for altering the electrical interconnection between the disk drives and the computer.

It is a further object of the present invention to provide a magazine for a plurality of removable disk drives that provides for its transportation by a robotic picking device.

The foregoing and other objects, features and advantages of the present invention will be more readily understood upon consideration of the following detailed description of the invention, taken in conjunction with the following drawings.

DETAILED DESCRIPTION OF A PREFERRED EMBODIMENT

Figure 1:
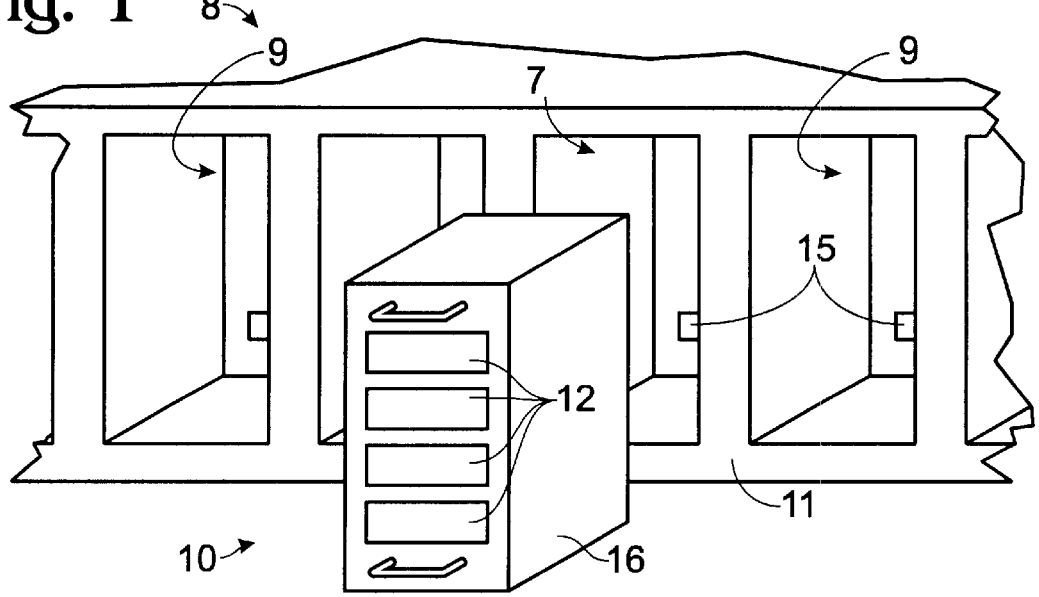
FIG. 1 is a pictorial illustration of a magazine for a plurality of removable disk drives according to the present invention.

Referring to FIG. 1, a magazine 10 for a plurality of removable disk drives 12 according to the present invention is shown in a library 8 having a rack 11 in communication with a library backplane 7 for interconnecting the individual disk drives and one or more host computers requesting information stored by the disk drives as is typical in the art. As shown, the rack 11 is suitably adapted to receive one or more magazines in one or more "slots" or bins 9. The library 8 is particularly advantageous where a number of the magazine 10 are provided that is greater than the number of slots 9.

The library includes a controller (not shown), which may be a general or special purpose computer, that implements communications between the host computer(s) and the magazine and that instructs a robotic picker (also not shown) to load and unload the magazine(s) into and out of the slots 9 in similar manner to that described in the aforementioned companion application. Accordingly, the magazine 10 is suitably provided for manipulation by the picker and this may be accomplished by any means known in the art.

The magazine 10 as described herein is particularly advantageous for supporting removable hard disk drives; however, the magazine may be adapted to support other removable memory devices, including solid state memory devices, without departing from the principles of the invention.

Figure 2:
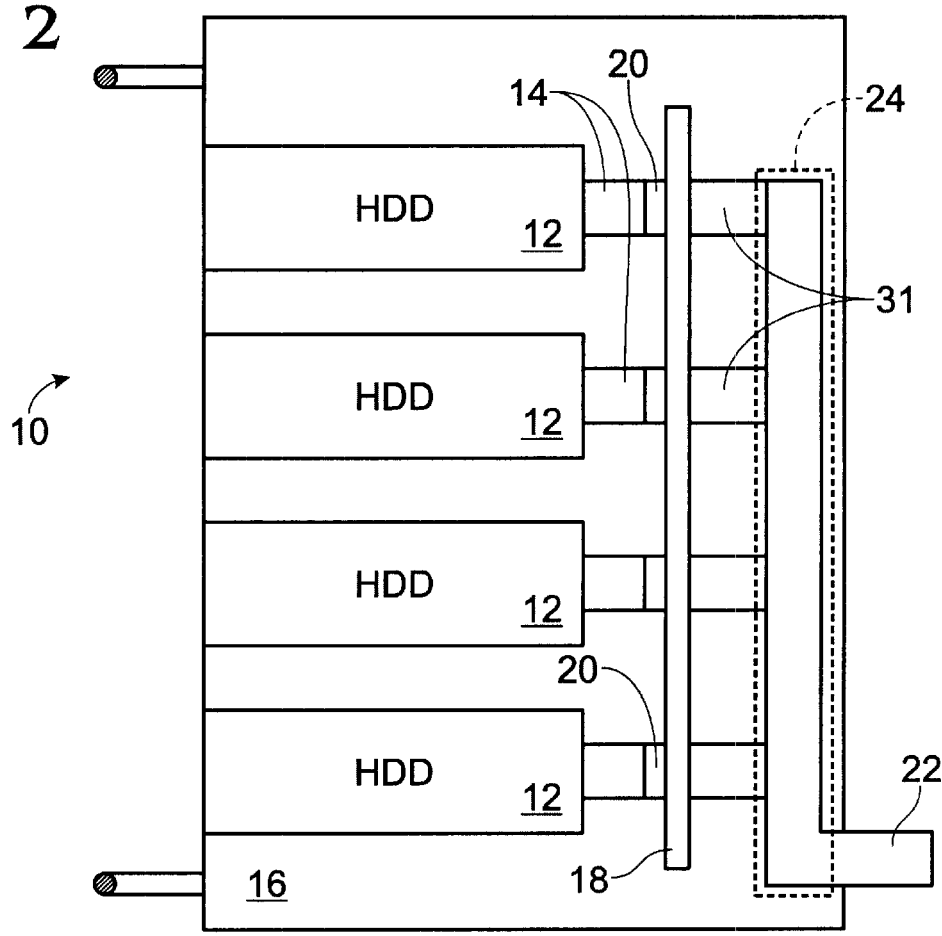
FIG. 2 is a pictorial schematic in side view of the magazine of FIG. 1.

Turning to FIG. 2, the magazine 10 includes a housing 16 which supports its own, magazine backplane 18 and a predetermined number of the disk drives 12. Each of the disk drives 12 includes a connector 14 for coupling to a complementary disk drive connector 20 in the magazine backplane that is for compatibility, the same as the connectors 15 of the library backplane. The connector 14 of a selected disk drive for installation in the magazine is inserted into the disk drive connector 20 of the magazine backplane to establish electrical interconnection between the disk drive and the magazine backplane. If the magazine is stocked with disk drives infrequently, this step may be easily carried out by a human operator; alternatively, it may be carried out by a robotic picker.

The magazine 10 also includes a module connector 22 that appears to the computer to be equivalent to the connector 14 of one of the disk drives. The module connector is inserted into the connector 15 of the library backplane to interconnect the magazine backplane and the library backplane and, ultimately, to interconnect the disk drives in the magazine to a host computer requesting to read from or write to the disk drives. This step is preferably carried out by a robotic picker.

Intermediate the connectors 20 and the connector 22 a connecting circuit 24 is preferably provided. The connecting circuit 24 may be part of the magazine backplane 18 or may be a separate part of the magazine. The connecting circuit electrically interconnects the magazine backplane and the module connector 22, and is adapted for selectably altering the nature of the interconnection. An example is provided below in connection with an intelligent hub feature of the connecting circuit.

The magazine 10 provides the outstanding advantage of permitting a single connection between the host computer and the plurality of disk drives 12, increasing the reliability of making the connection as well as reducing the number of connections that need to be made to couple the disk drives to the computer.

As mentioned previously, it is often desired to configure a plurality of otherwise independent disk drives into a redundant array. The RAID combines disk drives to gain improved data protection, increased speed, or both. For example, according to "RAID level 0," data is broken into pieces wherein each piece is written to a different drive. This provides high speed but little redundancy. As another example, according to "RAID level 1," data sent to one drive is duplicated on another drive. This provides high redundancy but the speed may not be increased. The software for coordinating the disk drives to operate as a redundant array is typically resident in the host computer. RAID systems are described in, e.g., The Electronics Handbook (Whitaker, ed.) IEEE Press, 1996 at §95.2, herein incorporated by reference in its entirety.

The present invention is particularly suited to be used in conjunction with RAID systems. While an array of the hard drives 12 is treated virtually as a single disk drive by the computer, the invention provides that the array may also be treated physically as a single disk drive by either the human operator installing the magazine 10 in or removing the magazine from the rack 11, or the robotic picking apparatus performing the same task.

RAID program code may be resident either in the library controller or the host computer(s) (hereinafter "RAID controller"). A preferred interface between the disk drives and the RAID controller is the fibre channel arbitration loop, wherein the disk drives are linked together to one another in a loop configuration. The fibre channel arbitrated loop is specified by ANSI X3.230-1994, X3.297-1997, and X3.303-1998, each incorporated by reference herein. It is implemented as a lower layer protocol that effectuates the transmission of data as frames. It can support any desired upper layer protocol for interpreting the data in the frames, such as but not limited to FCP SCSI or FICON (Fibre Connection), without the need for specialized hardware. For example, the library controller can act as a set of servers, a set of SCSI hard disks, a FICON storage subsystem, or a combination of these. The fibre channel arbitration loop need not employ optical fibers. In cooperation with the fibre channel arbitration loop, the magazine backplane 18 includes fibre channel SCA connectors 31.

One problem with the fibre channel arbitration loop is that if one of the disk drives fails, the loop becomes broken, and further communication with the remaining, operating disk drives in the loop is terminated. Another problem is that, to change a disk drive, it must be connected to or disconnected from two other disk drives and their associated connectors and cabling.

Figure 3:
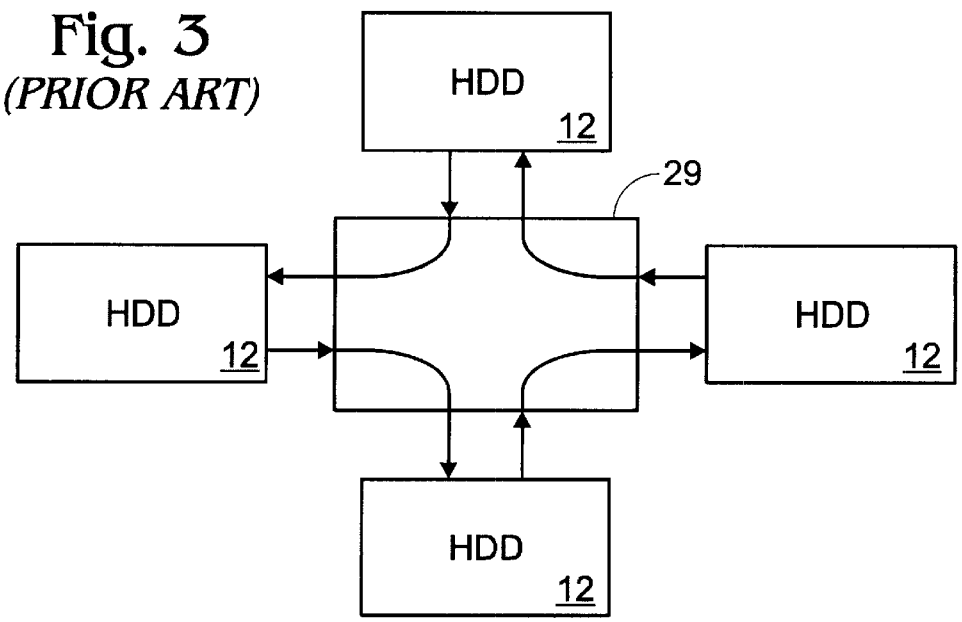
FIG. 3 is a schematic of a prior art hub for implementing a fibre channel arbitration loop.

A solution to the first problem noted above has been to provide a connecting circuit 24 that detects a link failure and switches the failed drive out of the loop, reconnecting the loop with respect to the remaining drives. A solution to the second problem has been to provided a "hub" 29 that internally provides the connections between the disk drives, as shown in FIG. 3.

Figure 4:
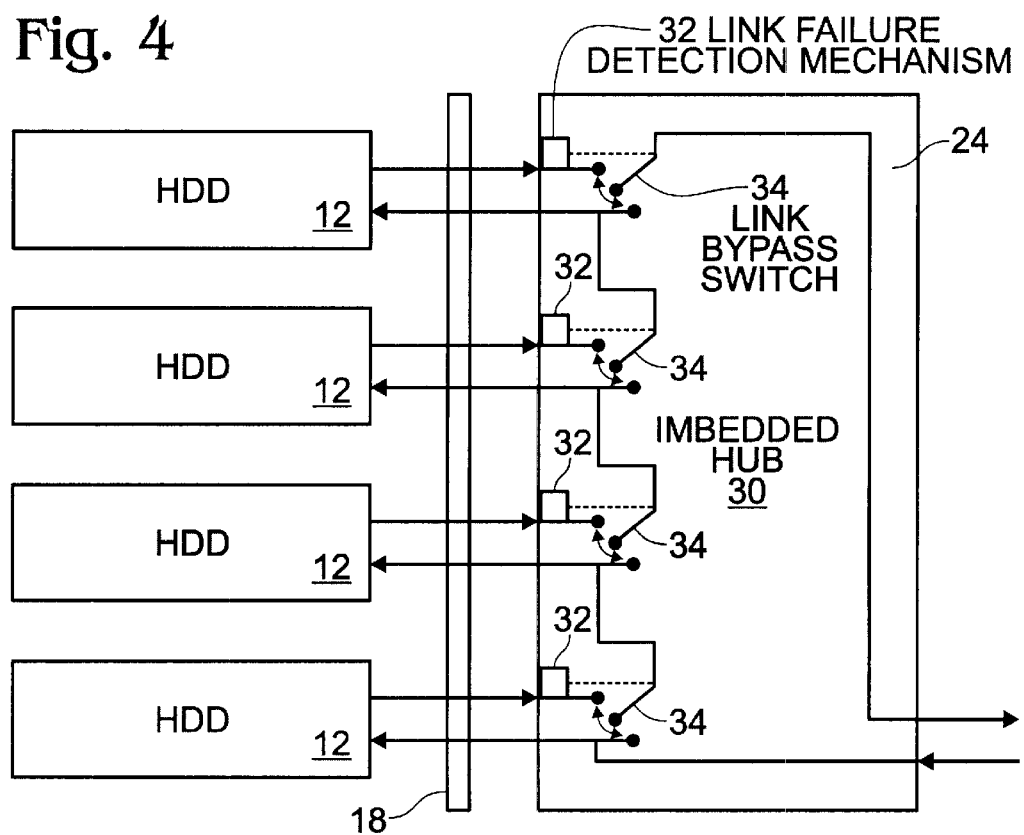
FIG. 4 is a pictorial schematic in side view of the magazine of FIG. 1 including an intelligent hub according to the present invention.

Turning to FIG. 4, the connecting circuit 24 of the magazine 10 preferably includes an intelligent hub 30 according to the present invention which is adapted to detect a failure of one or more of the disk drives and alter the connections between the remaining, operating disk drives to maintain loop function. For example, the intelligent hub 30 includes a link failure detection mechanism 32 for detecting a failed link or portion of the loop, and a link bypass switch 34 to bypass the failed link.

Though the magazine 10 provides particularly advantages when implementing the fibre channel arbitration loop interface protocol, any other desired interface standard, such as SCSI (Small Computer Systems Interface), may be employed without departing from the principles of the invention.

It is to be recognized that, while a particular magazine for a plurality of removable disk drives has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention of the use of such terms and expressions of excluding equivalents of the features shown and described or portions thereof, it being recognized that the scope of the invention is defined and limited only by the claims which follow.

What is claimed is:

1. A magazine for a plurality of separately removable disk drives, wherein the disk drives include respective first connectors for electrically interconnecting any one of the disk drives and a connector for a computer, the magazine comprising a magazine backplane, a module connector and a housing for supporting said magazine backplane, said module connector and the disk drives, said module connector being adapted for insertion into a complementary connector electrically interconnecting with a computer, said magazine backplane including a plurality of third connectors for electrically interconnecting the respective first connectors and said magazine backplane.

2. The magazine of claim 1, wherein said complementary connector is part of a library backplane that is electrically interconnected with the computer.

3. The magazine of claim 1, further comprising a connecting circuit electrically interconnecting said magazine backplane and said module connector and that is adapted for selectably altering the electrical interconnection therebetween.

4. The magazine of claim 3, wherein said connecting circuit includes an intelligent hub.

5. The magazine of claim 4, wherein said connecting circuit is adapted to cooperate in a fibre channel arbitration loop.

6. The magazine of claim 3, further comprising a plurality of fourth connectors corresponding to said first connectors for electrically interconnecting said magazine backplane and said connecting circuit.

7. The magazine of claim 6, wherein said fourth connectors are fibre channel SCA connectors.

8. A library of hard disk drives, comprising a library backplane and a first number of magazines, each for containing an associated plurality of separately removable disk drives, wherein the disk drives include respective first connectors for electrically interconnecting any one of the disk drives and a connector for a computer, each magazine comprising a magazine backplane, a module connector and a housing for supporting the magazine backplane, module connector and disk drives, each of said module connectors being adapted for insertion into one of a second number of complementary connectors of said library backplane electrically interconnecting with one or more associated host computers, each of said magazine backplanes including a plurality of respective third connectors for electrically interconnecting the respective first connectors and the magazine backplane, wherein the number of said magazines exceeds the number of said complementary connectors.

9. The library of claim 8, further comprising a number of slots in said library, each adapted to physically support one of the magazines, said slots each providing a corresponding one of said complementary connectors.

10. The library of claim 9, further comprising a library controller and a robotic picker adapted to install one or more of said magazines into one or more of said slots at the direction of said controller.

11. The library of claim 10, wherein said library controller is further adapted to communicate with said host computers according to a fibre channel arbitration loop.

12. The library of claim 11, Wherein each magazine includes a connecting circuit electrically interconnecting the respective said magazine backplane and module connector that is adapted for selectably altering the electrical interconnection therebetween.

13. The library of claim 12, wherein said connecting circuit includes an intelligent hub.

14. The library of claim 13, wherein said connecting circuit is adapted to cooperate in a fibre channel arbitration loop.

15. The library of claim 9, further comprising a plurality of fourth connectors corresponding to said first connectors for electrically interconnecting said magazine backplane and said connecting circuit.

16. The library of claim 15, wherein said fourth connectors are fibre channel SCA connectors.

17. A method for supporting a plurality of separately removable disk drives for electrically interconnecting the disk drives with a computer, the removable disk drives including respective first connectors for electrically interconnecting any one of the disk drives and a connector for a computer, the method comprising:

providing a magazine comprising a magazine backplane, a module connector and a housing for supporting said magazine backplane, said module connector it and the disk drives;

inserting the first connector of one of the disk drives into a first complementary connector electrically interconnected with said magazine backplane;

supporting the disk drives and said magazine backplane as a unit separate from the computer; and inserting said module connector into a second complementary connector electrically interconnecting with the computer.

18. The method of claim 17, further comprising providing a library backplane wherein said second complementary connector is part of said library backplane.

19. The method of claim 17, further comprising operating the disk drives as a RAID.

20. The method of claim 17, further comprising providing a connecting circuit electrically interconnecting said magazine backplane and said module connector and being adapted for selectably altering the electrical interconnection therebetween, and implementing, in said connecting circuit, a fibre channel arbitration loop.

21. The method of claim 17, wherein said step of inserting said module connector into a second complementary connector electrically interconnecting with the computer is carried out by a robotic picker.

22. The method of claim 21, wherein said step of inserting the first connector of one of the disk drives into a first complementary connector electrically interconnected with said magazine backplane is carried out by a robotic picker.

* * * * *

UNITED STATES PATENT AND TRADEMARK OFFICE
CERTIFICATE OF CORRECTION

PATENT NO. : 6,600,703 B1  Page 1 of 1
DATED : July 29, 2003
INVENTOR(S) : Robert G. Emberty et al.

It is certified that error appears in the above-identified patent and that said Letters Patent is hereby corrected as shown below:

<u>Column 6,</u>
Line 8, replace "Wherein" with -- wherein --
Line 32, delete "it"

Signed and Sealed this

Ninth Day of December, 2003

JAMES E. ROGAN
*Director of the United States Patent and Trademark Office*